United States Patent Office 2,701,734
Patented Feb. 8, 1955

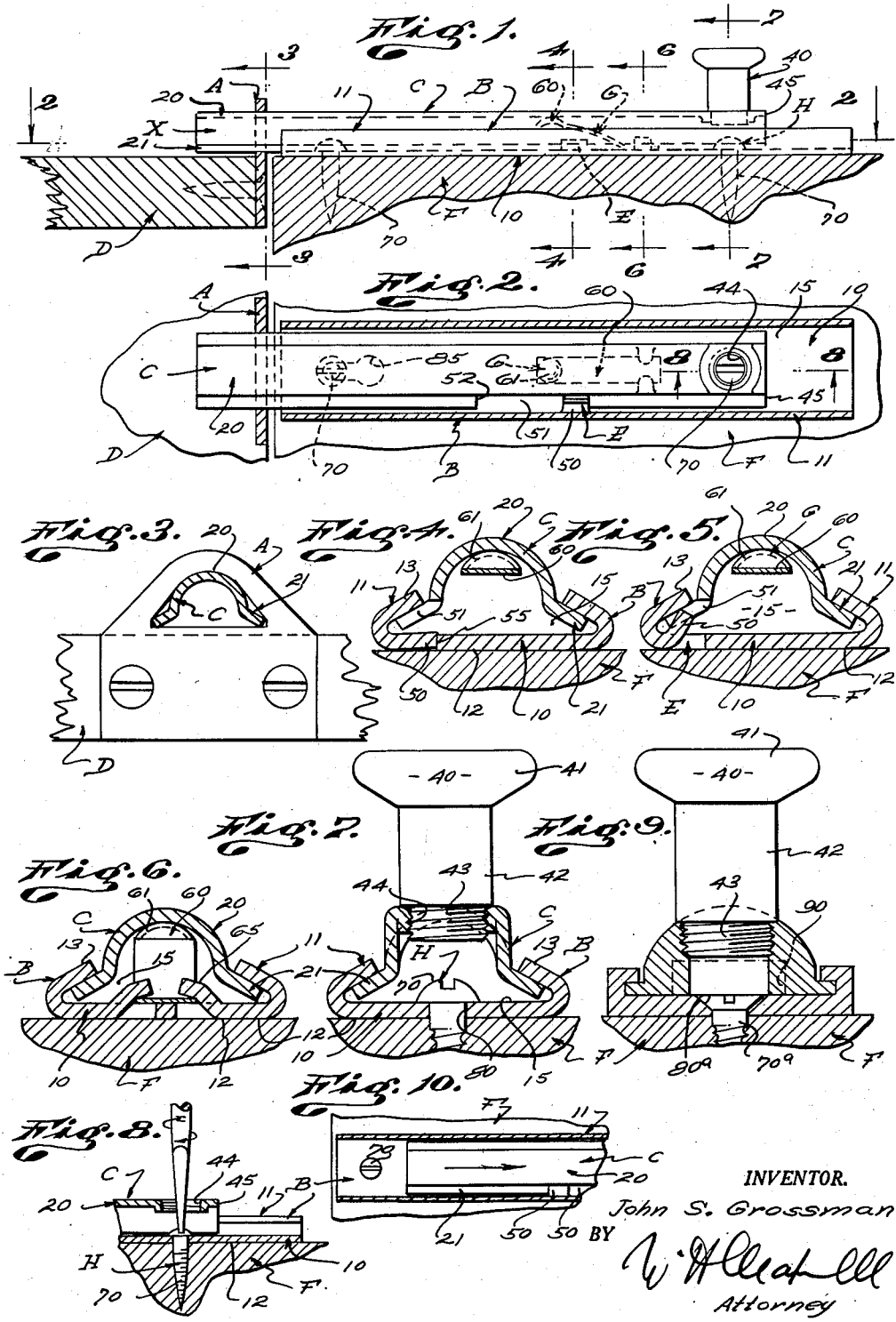

2,701,734

BOLT TYPE FASTENER

John S. Grossman, Los Angeles, Calif.

Application September 29, 1950, Serial No. 187,541

5 Claims. (Cl. 292—147)

This invention has to do with a bolt type fastener, it being a general object of the invention to provide a fastener of this character which is of simple, plain construction, making it sightly and inexpensive of manufacture.

The fastener as provided by the present invention is useful in various situations and can be varied as to size, form and construction to meet various conditions. The fastener is, however, particularly practical for securing doors or the like, and can be used in many situations in and around an average household. In the following description I will set forth the fastener in a simple form suitable for household use.

A general object of the invention is to provide a bolt type fastener characterized by a stationary base and a reciprocating bolt, and wherein the bolt is secured with reference to the base so that it has a limited stroke and does not become detached or separated from the base.

Another object of the invention is to provide a simple, practical, improved construction for maintaining friction or drag between the base and bolt so that the bolt does not move unless deliberately operated.

It is another object of the invention to provide a bolt type fastener of the general character referred to in which the mounting means involves screws or the like spaced lengthwise of the base, and such that they are completely concealed at all times or throughout operation of the structure.

In the bolt of the present invention the principal elements, namely, the base and bolt, are such that they can be advantageously formed entirely of sheet metal, making the structure very simple and inexpensive of manufacture and at the same time strong and durable.

The base involves a bottom which is flat and elongate in form and it has flanges at its longitudinal edges which project up and then in to provide lips that overlie or overhang the bottom so that there are opposed channels at the inner face of the bottom and opposing each other. The flanges of the base are of uniform size and shape and extended continuously from one end of the base to the other. The bolt has an elongate body that may correspond in length with the base and when the bolt is formed of sheet metal it is curved so that it is concavo-convex in transverse configuration. Edge flanges project out or away from the longitudinal edges of the body and extend into the channels of the base where they are held by the lips. The edge flanges may be like and of uniform size and shape, and preferably extend from one end of the body to the other.

The stop means involves a projection, preferably a lug, on one of the elements cooperating with a slot or recess in the other element. In a preferred arrangement the lug is a tongue-like projection struck upwardly from the bottom of the base to extend into a recess provided in the outer edge of one of the edge flanges on the body. The ends of the recess cooperate with the tongue to stop or limit movement of the bolt relative to the base. A drag spring is provided to act between the base and bolt and is preferably a leaf spring with one end anchored to one element, say, for instance, the base, and the other end frictionally bearing against the other element. The mounting means for the spring preferably involves ears struck from the bottom of the base opposing each other and embracing the end of the spring which is held.

The mounting means for the base involves spaced openings in the bottom of the base and screws engaged through the openings to enter the part to which the base is applied. One screw hole or opening is located near the striker end of the base while the other or second hole is located at a point spaced inward somewhat from the other end of the bottom. The body of the bolt is provided with a handle, preferably in the form of a knob with a shank releasably fastened to the body, as by being threaded into an opening in the body. When the bolt is in a predetermined position, for instance, a fully extended position, the opening of the body that receives the shank on the knob registers with the second screw hole in the bottom and thus provides access to the screw engaged through the second hole of the body when the knob with its shank is separated from the body. After both the mounting screws have been applied the shank of the knob is threaded tightly into the opening in the body leaving the assembled structure with both of the mounting screws completely concealed.

The various objects and features of my invention will be fully understood from the following detailed description of typical preferred forms and applications of the invention, throughout which description reference is made to the accompanying drawings, in which:

Fig. 1 is a view showing a fastener as provided by the present invention in operating position in connection with typical parts such as a frame and a door. Fig. 2 is a plan section taken as indicated by line 2—2 on Fig. 1, showing the bolt element in elevation and the handle of the bolt element removed. Fig. 3 is an enlarged sectional view taken as indicated by line 3—3 on Fig. 1. Fig. 4 is an enlarged transverse sectional view taken as indicated by line 4—4 on Fig. 1, and showing the structure before the stop means has been engaged. Fig. 5 is a view similar to Fig. 4 showing the stop means engaged. Fig. 6 is an enlarged detailed sectional view taken as indicated by line 6—6 on Fig. 1. Fig. 7 is an enlarged detailed transverse sectional view taken as indicated by line 7—7 on Fig. 1. Fig. 8 is a sectional view taken substantially as indicated by line 8—8 on Fig. 2 showing a tool applied to a mounting screw. Fig. 9 is a view similar to Fig. 7, showing a slightly different form of construction, and Fig. 10 is a view similar to a portion of Fig. 2 showing another relationship of parts.

The fastener as provided by the present invention can be used in various situations and in a typical case it may be applied to a frame F to cooperate with a keeper or striker plate A applied to a second part such as a door D, or the like.

The fastener involves, generally, two principal elements, namely, a base B and a bolt C. A stop means E limits relative movement between the base and bolt while drag means G holds the bolt against shifting accidentally relative to the base. A mounting means H serves for mounting the base on a support such, for example, as a frame F, or the like.

The construction provided by the present invention is such that both of the elements can be advantageously formed of sheet metal and, in Figs. 1 to 8 of the drawings, such sheet metal construction is illustrated. It is to be understood, however, that for various purposes or under certain conditions it may be desirable to form the structure of other than sheet metal, and as an example of another construction a second form is illustrated in Fig. 9 of the drawings.

In its preferred form the base element B is formed of an elongate flat rectangular body of sheet metal. The base, as shown throughout the drawings, includes an elongate bottom 10, rectangular in plan configuration and having flanges 11 at its longitudinal edges. The outer face 12 of the bottom is plane and flat to seat upon a support such as a frame F, and the flanges 11 are integral with and formed directly on the bottom. The flanges project up from the longitudinal edges of the bottom and then inward so they have lip portions 13 projecting inwardly and defining channels 15 at the inner side of the bottom, which channels oppose each other as shown throughout the drawings.

It is preferred in practice that the flanges 11 be uniform in size and shape and that they extend or continue from one end of the base B to the other. The channels 15, as formed by the flanges, are open at the ends of the base.

The bolt C, as provided by the present invention, is preferably formed of an elongate rectangular blank of sheet metal and has an elongate body 20 with edge flanges 21. In practice the body C may be varied in cross-sectional configuration, it being preferred, however, that it be curved or crowned in cross section so that it is concavo-convex, as shown throughout the drawings. The edge flanges 21 project from the side edges of the body 20 and they extend into the channels 15 where they are confined between lips 13. Various fits may be provided between the engaging parts of the base and bolt. However, in practice it is desirable to form the lips 13 of the base so they extend in and somewhat upwardly, as shown through the drawings, in which case the edge flanges 21 of the bolt can extend out and somewhat downward so that they seat flatly against the inner sides of the lips.

The bolt C is preferably provided with a handle 40 and in accordance with the present invention the handle is detachable from the bolt for the purpose hereinafter described. In the case illustrated the handle is shown as involving a knob 41 having a shank portion 42 releasably connected to the body 20 of the bolt by a threaded connection. The particular connection illustrated in the drawings involves a threaded lower end portion 43 of the shank 42 threaded into an opening 44 provided in the body 20 of the bolt from the upper side thereof, and at a point spaced somewhat inward from what I will term the back end 45 of the bolt. Where the bolt is formed of sheet metal, as shown in Figs. 1 to 8, the metal at the opening 44 is punched or bent in, providing ample stock in which to form threads to receive the part 43. The stop means E serves to stop or limit movement of the bolt relative to the base, and in so doing serves as a connection between the bolt and base preventing separation of these elements. In accordance with the invention the stop means involves a projection, preferably a lug, on one of the elements cooperating with the other element as by extending into a recess therein. In the case illustrated the projection is in the nature of a tongue 50 formed on the base element and when the tongue is in operating position it extends into a recess 51 provided in the bolt and at the ends of the movement of the bolt the ends 52 of the recess strike the tongue. The tongue 50 is preferably formed in the bottom 10 of the base, as by making a suitably shaped cut 55 in the bottom and while the cut is made the tongue may be slightly deflected or bent up, as indicated in Fig. 4 of the drawings. In this initial condition the tongue does not interfere with insertion of the bolt into position relative to the base. When the elements are assembled the tongue 50 is bent or struck up to a position such as is shown in Fig. 5 where it projects upwardly into the recess 51. The recess is formed or cut in one of the edge flanges 21 of the bolt. The recess is defined by end shoulders 52 which strike or engage the tongue 50 and thus limit the amount that the bolt can be shifted relative to the base. It is desirable, in practice, to form the bolt and base so that they are of the same length and to so locate the tongue and recess that the bolt is stopped at one end of its travel where the bolt is in and its ends coincide with the ends of the base, and is stopped at the other end of its travel with the forward end portion X of the bolt projecting from the base to cooperate with a keeper A.

The drag means preferably involves a spring operating between the base and bolt. In its preferred form the spring is a leaf spring 60 having one end anchored to the bottom of the base at the inner side thereof, while its other end is spaced above the bottom and bears upwardly against the interior of the body 20 of the bolt. Where the body 20 is concavo-convex in cross section, as shown in the drawings, it is desirable to provide the bolt engaging end portion of the spring with a curved face 61 to slidably seat against the interior of the body. A suitable anchoring means secures the leaf spring to the bottom. In the case illustarted the anchoring means involves opposed ears 65 formed on or struck from the bottom 10 so that the spring enters between the ears and is held thereby right against the inner face of the bottom, as clearly shown in Fig. 6 of the drawings. In practice it is preferred to shape and proportion the spring 60 so that it normally yieldingly bears upwardly in the bolt and thus holds the edge flanges 20 of the bolt tight against the inner sides of the lips 13 as shown throughout the drawings.

The mounting means provided by the present invention preferably utilizes mounting screws 70 and in a preferred form of the invention there are two screws 70, one at the forward end portion of the structure where it is, in effect, hooked to the base. The other screw is at the rear end portion of the structure where it is engaged through a screw hole 80 formed through the bottom of the base. At the forward end portion of the structure the bottom is provided with an opening 85 large enough to pass the head of the screw 70 and the opening has a narrow or slot-like extension that slidably receives the shank portion of the screw. The screw 70 to hold the forward end portion of the base is initially applied to the support, for instance, to a frame F, and then the base is applied to the screw by passing the head of the screw through the opening 85 following which the base is shifted so that the shank of the screw enters the extension of the opening. With the base thus hooked at its forward end portion the screw 70 to hold the rear end portion of the base is applied. To apply the screw to the rear end portion of the base the handle is removed and the bolt moved to a predetermined position, for instance, to a fully extended or projected position, as shown in Figs. 1, 2 and 8 of the drawings. In this position of the bolt the opening 43 that receives the shank of the handle is in register with the screw hole 80, thus permitting a screw to be inserted through the opening 44 and through the opening 80 to be applied to the support F. When the screw to hold the rear end portion of the base has been thus applied the handle is reinstalled, as by threading part 43 tight into opening 44. With the structure mounted as just described the bolt is securely anchored to the base to have limited movement between a proper retracted position and a locking or extended position, and throughout the movement of the bolt, as limited by the means E, the mounting screws are at all times covered or concealed.

If desired the mounting means may be modified somewhat from that above described and may be made such that both mounting screws are covered throughout normal operation of the bolt but the bolt can be withdrawn or retracted excessively to uncover the outermost screw which, in this case, can be simply inserted through a simple screw hole 80. In this case the recess 51 receiving the tongue 50 is varied or proportioned to allow the bolt to be retracted to an open position where its forward end uncovers the screw supporting the foremost end portion of the base. The relationship of parts just described is shown in Fig. 10 of the drawings.

In the form of the invention illustrated in Fig. 9 of the drawings the construction is such that it can be formed to advantage of extruded sections or forms rather than from sheet metal. It will be noted that in this case the parts are substantially the same in form and configuration as above described, except that it is desirable that mounting screws 70$^a$ be employed, which are recessed into the bottom of the base as in counterbores 80$^a$. Further, in this form of the invention a recess 90 is required in the otherwise solid bolt from the under side of the bolt to accommodate the drag means or spring 60.

From the foregoing description it will be apparent that the present invention provides a bolt fastener of very simple, inexpensive, construction and it will be apparent that the fastener is of sturdy dependable construction. The stop means, as provided by the present invention, does not require any separate parts to be added to or mounted on either of the principal elements, and the mounting means for the spring 60 likewise is such that it does not require any additional parts in the constructions. The removable handle makes possible a fully concealed mounting means and the screw provided for securing the handle to the bolt is simple, dependable and inexpensive.

The fact that the mounting means, as provided by the present invention, is fully concealed at all times, is a highly important feature of the construction, and it is to be noted that this feature is gained without adding any costly parts or devices to the construction.

Having described only typical preferred forms and applications of my invention, I do not wish to be limited or restricted to the specific details herein set forth, but wish to reserve to myself any variations or modifications Having described my invention, I claim:

1. A fastener of the character described including, a body of sheet metal forming an elongate base with a substantially flat bottom and opposed flanges at the side edges of the base, a second body of sheet metal forming an elongate bolt located over the base with a body curved to be concavo-convex with its concave side opposing the base and having edge flanges on opposite edges of the body engaged under and held by the flanges of the base, there being an open chamber established by the base and bolt between the bottom and body, stop means covered by one of the flanges of the base and limiting movement of the bolt longitudinally of the base, and drag means located in the chamber and including, a leaf spring with one end portion anchored to the base and the other end portion bearing upwardly in the body of the bolt, the stop means including spaced shoulders on one of the flanges of the bolt and a tongue integral with and projecting up from the bottom of the base between and engageable by the shoulders.

2. A fastener of the character described including, a body of sheet metal forming an elongate base with a flat bottom and opposed side flanges, a second body of sheet metal forming an elongate bolt over the base with a body curved to be concavo-convex and edge flanges on the body engaged under and held by the flanges of the base, there being an open chamber established by the base and bolt between the bottom and body, a flange of the bolt having spaced opposed shoulders and the bottom of the base having a cut therein and the bottom being deflected upwardly adjacent the cut forming a stop tongue between the shoulders, and drag means resisting movement of the bolt relative to the base including an elongate leaf spring extending longitudinally of the bolt between the bolt and the bottom of the base.

3. In combination, a base having openings in its end portions for the reception of mounting screws, a bolt overlying the base, means permanently holding the base and bolt in sliding engagement with each other for limited movement of the bolt longitudinally of the base between a retracted position and an extended position, the openings being permanently beneath and covered by the bolt, the bolt having an opening registrable with one of the said openings in the base when the bolt is within its limit of travel relative to the base, and a handle having a part releasably held in the opening in the bolt.

4. In combination, a base having openings in its end portions for the reception of mounting screws, a bolt overlying the base, means permanently holding the base and bolt in sliding engagement with each other for limited movement of the bolt relative to the base between a retracted position and an extended position, the openings being permanently beneath and covered by the bolt throughout operation of the bolt relative to the base, the bolt having an opening registrable with one of the said openings in the base, and a handle having a part releasably held in the said opening in the bolt, the other opening in the base being shaped to effect hooking engagement between the base and a screw.

5. In combination, a body of sheet metal forming a base with a substantially flat bottom having openings in its end portions for the reception of mounting screws, a second body of sheet metal forming a bolt overlying the base and having a concavo-convex body with its concave side opposing the bottom and cooperating therewith to define a chamber, means permanently holding the base and bolt in sliding engagement with each other for limited movement of the bolt longitudinally relative to the base between a retracted position and an extended position, said means being carried in the chamber, the openings in the base being permanently beneath and covered by the bolt, the bolt having an opening through it registrable with one of said openings in the base, and a handle having a part releasably held in the opening in the bolt, the base having a flat bottom and the bolt having a body curved to be concavo-convex in cross-sectional configuration.

References Cited in the file of this patent

UNITED STATES PATENTS

| | | |
|---|---|---|
| 67,549 | Hunter | Aug. 6, 1867 |
| 2,103,989 | Machinist | Dec. 28, 1937 |
| 2,482,341 | Holmsten | Sept. 20, 1949 |
| 2,527,413 | Grossman | Oct. 24, 1950 |

FOREIGN PATENTS

| | | |
|---|---|---|
| 7,847 | Great Britain | Apr. 20, 1894 |
| 428,494 | Great Britain | May 14, 1935 |
| 434,924 | Great Britain | Sept. 11, 1935 |
| 548,971 | France | Nov. 7, 1922 |